(12) United States Patent
Kneezel et al.

(10) Patent No.: US 6,464,347 B2
(45) Date of Patent: Oct. 15, 2002

(54) LASER ABLATED FILTER

(75) Inventors: Gary A. Kneezel, Webster, NY (US); John R. Andrews, Fairport, NY (US); Robert V. Lorenze, Jr., Webster, NY (US); Almon P. Fisher, Rochester, NY (US); Mehmet Z. Sengun, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/727,202

(22) Filed: Nov. 30, 2000

(65) Prior Publication Data

US 2002/0063764 A1 May 30, 2002

(51) Int. Cl.$^7$ .............................................. M41J 2/175
(52) U.S. Cl. ...................................................... 347/93
(58) Field of Search ............................ 347/86, 87, 92, 347/93; 210/444, 448, 498, 499, 321.84

(56) References Cited

U.S. PATENT DOCUMENTS

| 4,726,900 A | * | 2/1988 | Keskinen et al. | ........... 210/488 |
| 5,154,815 A | * | 10/1992 | O'Neill | ........... 205/75 |
| 5,742,314 A | * | 4/1998 | Hayes | ........... 347/93 |
| 5,948,255 A | * | 9/1999 | Keller et al. | ........... 210/321.84 |
| 6,267,251 B1 | * | 7/2001 | Sullivan | ........... 210/488 |

\* cited by examiner

*Primary Examiner*—Anh T. N. Vo
(74) *Attorney, Agent, or Firm*—Perman & Green, LLP

(57) ABSTRACT

A filter structure having a plurality of pores through the structure each of the pores having a cross section with a length (L) and a width (W) wherein the dimension of L is greater than the dimension of W. The filter can be used with an improved ink jet printhead having an ink inlet in one of its surfaces, a plurality of nozzles, individual channels connecting the nozzles to an internal ink supplying manifold, the manifold being supplied ink through the ink inlet, and selectively addressable heating elements for expelling ink droplets, the improved ink jet printhead comprising a substantially flat filter having predetermined dimensions and being bonded to the printhead containing the ink inlet, the filter having a plurality of pores, therethrough, each of the pores having a cross section with a length=L and a width=W, wherein the dimension of L is greater than the dimension of W. Also disclosed is a method for fabricating a filter element comprising the steps of positioning a thin polymer film in the output radiation path of an ablating laser, and controlling the laser output so that a plurality of pores are formed in portions of the polymer film, each of the pores having a cross section with a length (L) and a width (W), wherein the dimension of L is greater than the dimension of W.

28 Claims, 6 Drawing Sheets

LASER ABLATED FILTER

RELATED APPLICATIONS

U.S. Ser. No. 08/926,692, filed Sep. 10, 1997 and now U.S. Pat. No. 6,139,674 issued on Oct. 31, 2000 and U.S. Ser. No. 09/431,059 filed Nov. 1, 1999 and now U.S. Pat. No. 6,199,980 issued on Mar. 13, 2001.

BACKGROUND OF THE INVENTION

1. Field of the Invention

This application relates to a unique structure for a filter as typically used in microfluidic devices and a method of manufacturing such a filter and, more particularly a unique structure for a filter having particular use in an ink jet printer system, i.e. having reduced fluidic pressure drop across the filter with fluid flow.

2. Description of the Prior Art

There is a trade-off in filter design between flow resistance and filter effectiveness especially for small particulate size. For a given minimum distance between circular filter pores, the percent open area of the filter is decreased for small diameter pores. In thermal ink jet systems, for example, the implication for small enough pore size is that the printing frequency might be limited by the flow through the filter. For various drop sizes and printing frequencies simple patterns of circular pores are adequate. However, there is a general interest in going to smaller drop sizes e.g. (requiring a finer filter) and higher frequencies in the order of 15 khz and higher.

In new areas of microfluidics, microfluidic carrying devices and their components are small, typically in the range of 500 microns down to as small as 1 micron, and possibly even smaller. Such microfluidic devices pose difficulties with regards to preventing fluid path blockage within the microscopic componentry, and especially when the particular microscopic componentry is connected to macroscopic sources of fluid. Yet such microfluidic devices are important in a wide range of applications that include drug delivery, analytical chemistry, microchemical reactors and synthesis, genetic engineering, and printing technologies including a wide range of ink jet technologies, such as thermal ink jet printing.

A typical thermally actuated drop-on-demand ink jet printing system, for example, uses thermal energy pulses to produce vapor bubbles in an ink-filled channel that expels droplets from the channel orifices of the printing system's printhead. Such printheads have one or more ink-filled channels communicating at one end with a relatively small ink supply chamber (or reservoir) and having an orifice at the opposite end, also referred to as the nozzle. A thermal energy generator, usually a resistor, is located within the channels near the nozzle at a predetermined distance upstream therefrom. The resistors are individually addressed with a current pulse to momentarily vaporize the ink and form a bubble which expels an ink droplet. A meniscus is formed at each nozzle under a slight negative pressure to prevent ink from weeping therefrom.

Some of these thermal ink jet printheads are formed by mating two silicon substrates. One substrate contains an array of heater elements and associated electronics (and is thus referred to as a heater plate), while the second substrate is a fluid directing portion containing a plurality of nozzle-defining channels and an ink inlet for providing ink from a source to the channels. This substrate is referred to as a channel plate which is typically fabricated by orientation dependent etching methods.

The dimensions of ink inlets to the die modules, or substrates, are much larger than the ink channels; hence, it is desirable to provide a filtering mechanism for filtering the ink at some point along the ink flow path from the ink manifold or manifold source to the ink channel to prevent blockage of the channels by various particles typically carried in the ink. Even though some particles of a certain size do not completely block the channels, they can adversely affect directionality of a droplet expelled from these printheads. Any filtering technique used should also minimize air entrapment in the ink flow path.

Various techniques for forming filters are disclosed in the prior art U.S. Pat. Nos. 5,124,717, 5,141,596, 5,154,815 and 5,204,690 disclose fabrication techniques for forming filters integral to a printhead using patterned etch resistant masks. This technique has the disadvantage of flow restriction due to the proximity to single channels and poor yields due to defects near single channels. These patents are intended to be incorporated by reference herein in their entirety.

U.S. Pat. No. 4,864,329 to Kneezel et al. discloses a thermal ink jet printhead having a flat filter placed over the inlet thereof by a fabrication process which laminates a wafer size filter to the aligned and bonded wafers containing a plurality of printheads. The individual printheads are obtained by a sectioning operation, which cuts through the two or more bonded wafers and the filter. The filter may be a woven mesh screen or preferably a nickel electroformed screen with predetermined pore size. Since the filter covers one entire side of the printhead, a relatively large contact area prevents delimitation and enables convenient leak-free sealing. Electroformed screen filters having pore size which is small enough to filter out particles of interest result in filters which are very thin and subject to breakage during handling or wash steps. Also, the preferred nickel embodiment for a filter is not compatible with certain inks resulting in filter corrosion. Finally, the choice of materials is limited when using this technique. Woven mesh screens are difficult to seal reliably against both the silicon ink inlet and the corresponding opening in the ink manifold. Further, plating with metals such as gold to protect against corrosion is costly. This patent is intended to be incorporated by reference herein in its entirety.

In all cases, conventional filters ordinarily suffer from blockage by particles larger than the pore size, and by air bubbles. Conventional filters used for thermal ink jet printheads help keep the jetting nozzles and channels free of clogs caused by dirt and air bubbles carried into the printhead from upstream sources such as from the ink supply cartridge. One common failing of all filters is that dirt can accumulate on the filter surface causing restricted fluid flow. Another kind of blockage is when an air bubble rests on the filter surface thereby covering a large group of fluid flow holes preventing any fluid from passing through that region of the filter.

In laser ablated filters, which have been described in commonly assigned U.S. Pat. No. 6,139,674, to Markham et al for a Method Of Making An Ink Jet Printhead Filter By Laser Ablation and co-pending U.S. patent application Ser. No. 09/431,056, filed Nov. 1, 1999, circular holes are laser ablated in a plastic film, which may then be bonded over the ink inlets of many die at once in a thermal ink jet wafer. However, even when the holes are packed as tightly as possible, the open area for typical filter dimensions may be on the order of 40%. This patent and patent application are incorporated by reference herein in their entirety.

FIGS. 3A and 3B illustrates two arrays of circular holes 10 as found in known filter configurations. In FIG. 3A an array of laser ablated holes 10 is shown on a square grid. Each hole 10 has a diameter d, and the spacing between holes 10 is s in both the X and Y directions. FIG. 3B illustrates a hexagonal close packed array of laser ablated holes 10. Each hole has a diameter d. The minimum spacing between adjacent holes is s. Thus in both cases the hole diameter is d and the spacing between adjacent holes is s. In FIG. 3A the holes are on a square grid, while in FIG. 3B the holes are more tightly packed on a hexagonal close packed grid. For example, for a 600 spi thermal ink jet color printhead which shoots a drop size of 10 pl, a pore diameter of d=10 microns has been found to be capable of blocking particulates which could potentially clog jets, while also not restricting the printing frequency below 12 kHz. (Actually there is a taper of the hole size going through the typically 25 micron thick Upilex plastic film, but 10 microns is the nominal diameter.) A typical spacing between pores is s=5 microns. A simplified dimensional analysis of filter flow capabilities indicates that the flow resistance of a close-packed filter depends on the pore radius. For a simple filter, the flow resistance goes as $1/(nr^4)$ where n is the number of pores and r is the pore radius. The number of pores goes approximately as $r^{-2}$ so that the flow resistance goes as $r^{-2}$, assuming efficient packing. Since for round hole filters one is limited to a diameter somewhat smaller than the minimum opening in an ink jet channel, there is a significant limitation in the sustainable flow rate through a filter given a certain area available for the filter.

In an ink jet system environment, one of the basic objectives of the embodiments of the present invention is to provide a filter which will prevent particulate matter of a size sufficient to block channels from entering the printhead channels, improve ink droplet directionality in an ink jet printhead (i.e. improve functionality of the ink jet system) and minimize air entrapment along the ink flow path. In order to decrease the flow resistance due to the filter, it is also an objective of the embodiments of the present invention to make pores that are narrow enough in one dimension to exclude particles large enough to block channels, but elongated in the other dimension, In order to improve the filtration effectiveness for anisotropic particles, the following pore geometries are incorporated within the features of the present invention: a) slots with constrictions along the length of the slot, or b) slots which have curvature along their length (sinusoidal or saw-toothed, for example). The optimal length of the slots will be determined not only by open area and filtration effectiveness, but also by mechanical strength of the filter. In accordance with features of the present invention, there will need to be occasional bridges between slots.

SUMMARY OF THE INVENTION

To achieve the advantages described herein in accordance with the purpose of the invention, the inventive features as embodied by the present invention include a filter structure having a plurality of pores through the structure, each of the pores having a cross-section with a length (L) and a width (W) wherein the dimension of L is greater than the dimension of W. In accordance with the features of the present invention the pore structure is formed by laser ablation.

Another embodiment of the present invention is directed to an improved jet printhead having an ink inlet in one of its surfaces, a plurality of nozzles, individual channels connecting the nozzles to an internal ink supplying manifold, the manifold being supplied ink through the ink inlet, and selectively addressable heating elements for expelling ink droplets, the improved ink jet printhead comprising a substantially flat filter having predetermined dimensions and being bonded to the printhead containing the ink inlet, the filter having a plurality of pores, therethrough each of the pores having a length=L and a width=W, wherein the dimension of L is greater than the dimension of W.

Still another embodiment of the present invention is directed to a method for fabricating a filter element comprising the steps of: positioning a thin polymer film in the output radiation path of an ablating laser, and controlling the laser output so that a plurality of pores are formed in portions of the polymer film; each of the pores having a cross section with a length (L) and a width (W), wherein the dimension of L is greater than the dimension of W.

BRIEF DESCRIPTION OF THE DRAWINGS

The accompanying drawings, which are incorporated in and constitute a part of the specification illustrate one embodiment of the invention and, together with the description, serve to explain the principles of the invention.

DETAILED DESCRIPTION OF THE PREFERRED EMBODIMENT

For a general understanding of the features of the present invention, reference is made to the drawings.

It will become evident from the following description of the various embodiments of the present invention that the various embodiments of this invention are equally well suited for use in a wide variety of microfluidic carrying devices, and is not necessarily limited in its application to an ink jet system or the particular thermal ink jet print system shown and described herein. However, a thermal ink jet printing system is being described in detail to give an example of the type of environment (i.e. the kind of microfluidic device) that can be used with the present invention.

Figure 1:
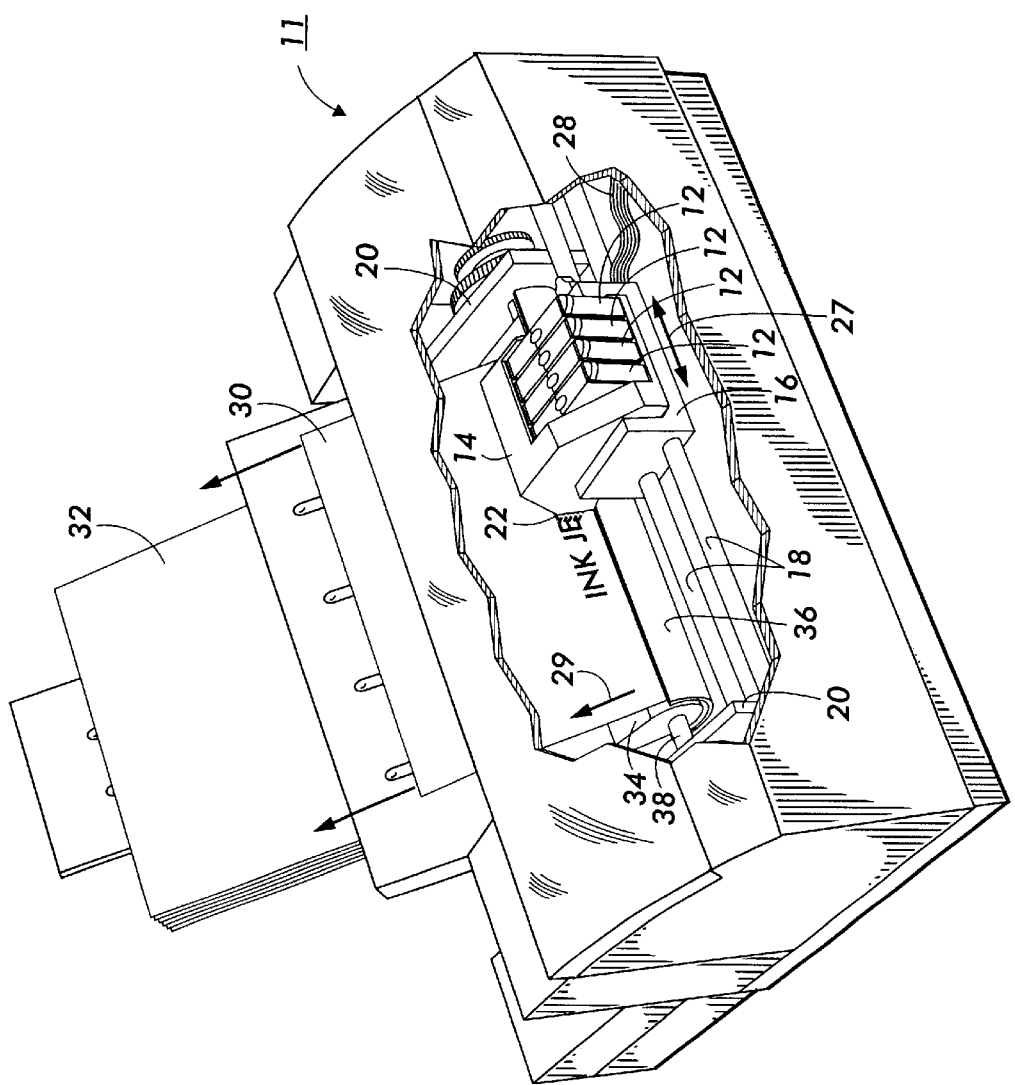
FIG. 1 is an isometric view of a color ink jet printer having replaceable ink jet supply tanks.
Figure 2:
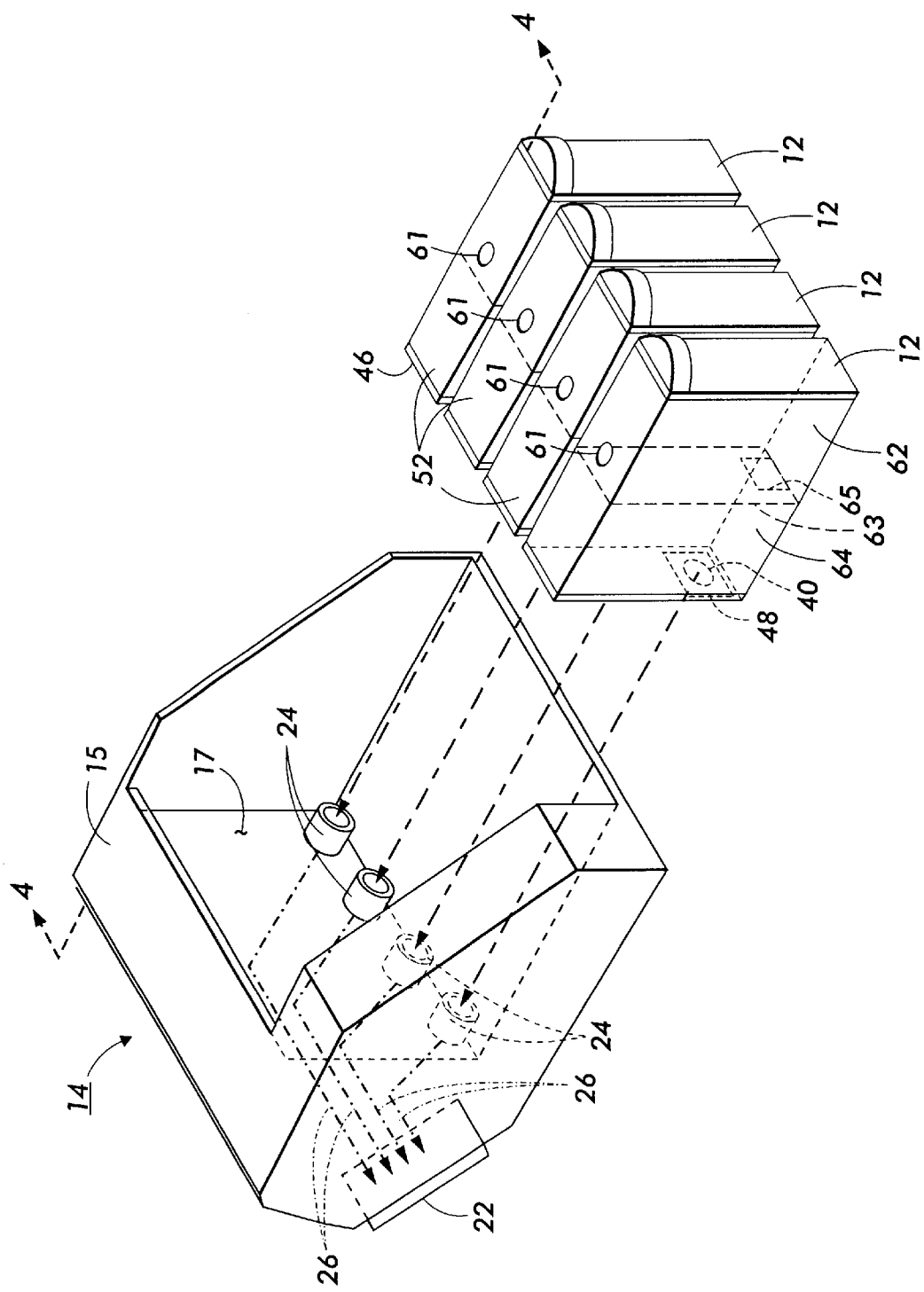
FIG. 2 is a partially exploded isometric view of an ink jet cartridge with integral printhead and ink connectors and replaceable ink tank.

FIG. 1 illustrates an isometric view of a multicolor thermal ink jet printer 11 which can incorporate any of the preferred embodiments of the present invention. The particular printer shown and described herein includes four replaceable ink supply tanks 12 mounted in a removable ink jet cartridge 14. The ink supply tanks may each have a different color of ink, and in a preferred embodiment, the tanks have yellow, magenta, cyan, and black ink. The removable cartridge is installed on a translatable carriage 16 which is supported by carriage guide rails 18 fixedly mounted in frame 20 of the printer 11. The removable cartridge is designed to consume or deplete the ink from at least ten ink supply tanks of the same color of ink. The carriage is translated back and forth along the guide rails by any suitable means (not shown) as well known in the printer industry, under the control of the printer controller (not shown). Referring also to FIG. 2, the ink jet cartridge 14 comprises a housing 15 having an integral multicolor ink jet printhead 22 and ink pipe connectors 24 which protrude from a wall 17 of the cartridge for insertion into the ink tanks when the ink tanks are installed in the cartridge housing. Ink flow paths, represented by dashed lines 26, in the cartridge housing interconnects each of the ink connectors with the separate inlets of the printhead. The ink jet cartridge, which comprises the replaceable ink supply tanks that contain ink for supplying ink to the printhead 22, includes an interfacing printed circuit board (not shown) that is connected to the printer controlled by ribbon cable 28 through which electric signals are selectively applied to the printhead to selectively eject ink droplets from the printhead nozzles (not shown). The multicolor printhead 22 contains a plurality of ink channels (not shown) which carry ink from each to the ink tanks to respective groups of ink ejecting nozzles of the printhead, When printing, the carriage 16 reciprocates back and forth along the guide rails 18 in the direction of arrow 27. As the printhead 22 reciprocates back and forth across a recording medium 30, such as single cut sheets of paper which are fed from an input stack 32 of sheets, droplets of ink are expelled from selected ones of the printhead nozzles towards the recording medium 30. The nozzles are typically arranged in a linear array perpendicular to the reciprocating direction of arrow 27. During each pass of the carriage 16, the recording medium 30 is held in a stationary position. At the end of each pass, the recording medium is stepped in the direction of arrow 29. For a more detailed explanation of the printhead and the printing thereby, refer to U.S. Pat. No. 4,571,599 and U.S. Pat. Re 32,572, the relevant portions of which are incorporated herein by reference.

A single sheet of recording medium 30 is fed from the input stack 32 through the printer along a path defined by a curved platen 34 and a guide member 36. The sheet is driven along the path by a transport roller 38 as is understood by those skilled in the art or, for instance, as illustrated in U.S. Pat. No. 5,534,902, incorporated herein by reference. As the recording medium exists a slot between the platen 34 and guide member 36, the sheet 30 is caused to reverse bow such that the sheet is supported by the platen 34 at a flat portion thereof for printing by the printhead 22.

With continued reference to FIG. 2, ink from each of the ink supply tanks 12 is drawn by capillary action through the outlet port 40 in the ink supply tanks, the ink pipe connectors 24, and inflow paths 26 in the cartridge housing to the printhead 22. The ink pipe connectors and flow paths of the cartridge housing supplies ink to the printhead ink channels, replenishing the ink after each ink droplet ejection from the nozzle associated with the printhead ink channel. It is important that the ink at the nozzles be maintained at a slightly negative pressure, so that the ink is prevented from dripping onto the recording medium 30, and ensuring that ink droplets are placed on the recording medium only when a droplet is ejected by an electrical signal applied to the heating element in the ink channel for the selected nozzle. A negative pressure also ensures that the size of the ink droplets ejected from the nozzles remain substantially constant as ink is depleted from the ink supply tanks. The negative pressure is usually in the range of −0.5 to −5.0 inches of water. One known method of supplying ink at a negative pressure is to place within the ink supply tanks an open cell foam or needled felt in which ink is absorbed and suspended by capillary action. Ink tanks which contain ink holding material are disclosed, for example, in U.S. Pat. Nos. 5,185,614; 4,771,295, and 5,486,855.

As shown in FIG. 2, each supply tank 12 comprises a housing 52 of any suitable material, such as, for example, polypropylene which contains two compartments separated by a common wall 63. A first compartment 62 has ink stored therein which is introduced therein through inlet 61. A second compartment 64 has an ink absorbing material 42, such as, for example, an open cell foam member for needled felt member inserted therein. An example of an open cell foam is reticulated polyurethane foam. An example of a needled felt member is a needled felt of polyester fibers as disclosed in U.S. Pat. No. 5,519,425 and incorporated herein by reference. Generally, as disclosed in the '425 patent, a scavenger member (not shown) is incorporated adjacent the outlet port 40 when a needled felt of polyester fibers are used which has greater capillary than the needled felt. Ink from compartment 62 moves through aperture 65 in the common wall 63 to contact the ink absorbing material member 42 and saturate the ink absorbing material member with ink. The ink absorbing material member before insertion into the second compartment 64 has between three and four times the volume of compartment 64, so that the ink absorbing material member which in the preferred embodiment is a foam member, is compressed 25% to 30% of its original size. The second compartment of the ink supply tank 12 has an open end 44 through which the ink absorbing material member 42 is inserted. Cover plate 46 has the same material as the housing 52 and has an outlet port 40, shown in dashed line. The filtration illustrated is not a permanent part of the printhead or cartridge housing, but instead a microfiltration element in the form of a polyester mesh filter which, in one embodiment, is heat staked to weld it on the cover plate side which contacts the foam member. The filter has a filtration rating of 10 µm to 15 µm. The cover plate 46 is welded into place following foam member insertion into the second compartment of the ink supply tank. Strength of the heat stake weld is important only during the fabrication process, for the filter is otherwise mechanically locked in place by the wall 17 of the cartridge 14 containing the ink pipe connectors 24, and the force from the compressed ink absorbing material member 42 when the ink supply tank 12 is installed in the cartridge. This yields a robust construction with an internal retention mechanism that keeps contaminants at their point of origin.

Figure 9:
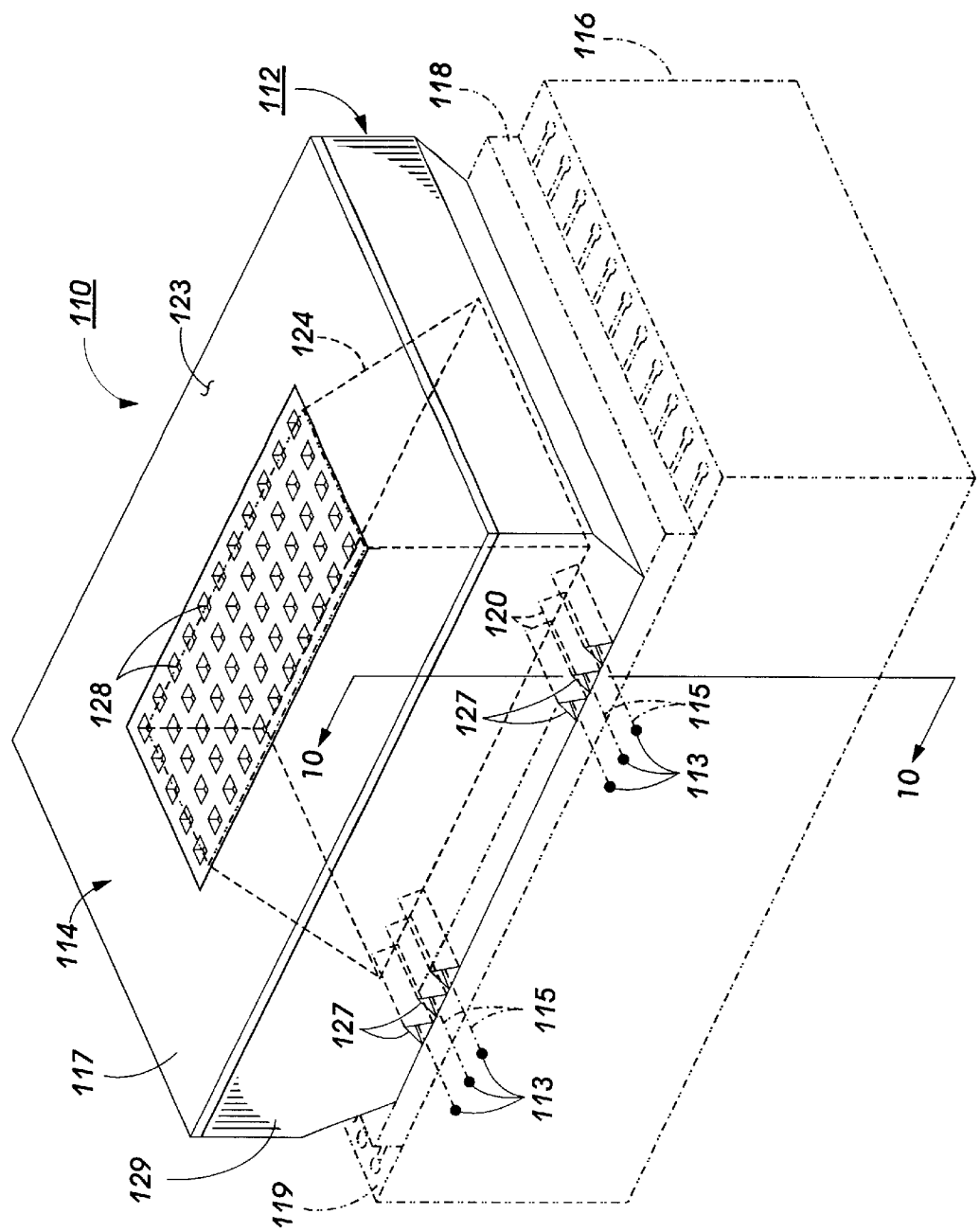
FIG. 9 is a schematic isometric view of an inkjet printhead module with a filter bonded to the ink inlet corresponding to FIG. 1 of U.S. Pat. No. 6,139,674.
Figure 10:
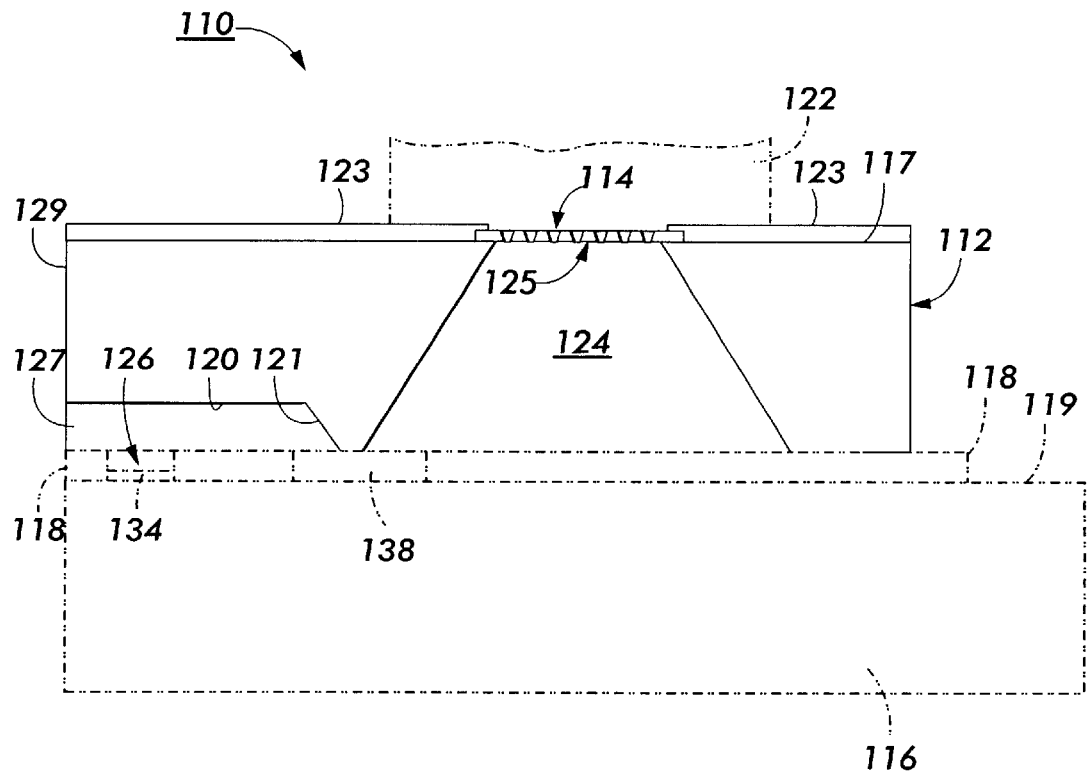
FIG. 10 is a cross-sectional view of an inkjet printhead module with a filter bonded to the ink inlet corresponding to FIG. 2 of U.S. Pat. No. 6,139,674.

Referring to FIGS. 9 and 10, there is shown a die module print head 110 similar to that described in U.S. Pat. No. 6,139,674, having a laser ablated filter 114 of this invention covering its ink inlets 125. This present invention describes several novel pore configurations for the laser ablated filter 114.

In FIGS. 9 and 10, a thermal ink jet printhead or die module 110 in accordance with present invention is shown comprising channel plate 12 with laser-ablated filter of this invention 114 and heater plate 116 shown in dashed line. The pores of the filter 114 are shown schematically, but would have a structure comprising any of the defined embodiments of the present invention. A patterned film layer 118 is shown in dashed line having a material such as, for example, RISTON.RTM., VACREL.RTM., or polyimide, and is sandwiched between the channel plate 112 and the heater plate 116. As disclosed in U.S. Pat. No. 4,774,530 to Hawkins and incorporated herein by reference in its entirety, the thick film layer is etched to remove material above each heating element 134, thus placing them in pits 126. Material is removed between the closed ends 121 of ink channels 120 and the reservoir 124, forming trench 138 placing the channels 120 into fluid communication with the reservoir 124. For illustration purposes, droplets 1 13 are shown following trajectories 115 after ejection from the nozzles 127 in front face 129 of the printhead.

Channel plate 112 is permanently bonded to heater plate 116 or to the patterned thick film layer 118 optionally deposited over the heating elements and addressing electrodes on the top surface 119 of the heater plate and patterned as taught in the above-mentioned U.S. Pat. No. 4,774,530. The channel plate is preferably silicon and the heater plate may be any insulative or semiconductive material as disclosed in U.S. Pat. No. Reissue 32,572 to Hawkins et al. which is incorporated by reference herein. The illustrated embodiment of the present invention is described for an edge-shooter type printhead, but could readily be used for a roofshooter configured printhead (not shown) as disclosed in U.S. Pat. No. 4,864,329 to Kneezel et al., wherein the ink inlet is in the heater plate, so that the integral filter of the present invention could be fabricated in a similar manner. U.S. Pat. No. 4,864,329 is incorporated herein by reference.

Channel plate 112 of FIG. 1 contains an etched recess 124, shown in dashed line, in one surface which, when mated to the heater plate 116, forms an ink reservoir. A plurality of identical parallel grooves 120, shown in dashed line and having triangular cross sections, are etched (using orientation dependent etching techniques) in the same surface of the channel plate with one of the ends thereof penetrating the front face 129. The other closed ends 121 (FIG. 10) of the grooves are adjacent to the recess 124. When the channel plate and heater plate are mated and diced, the groove penetrations through front face 129 produce the orifices or nozzles 127. Grooves 120 also serve as ink channels which contact the reservoir 124 (via trench 138) with the nozzles. The open bottom of the reservoir in the channel plate, shown in FIG. 10, forms an ink inlet 125 and provides means for maintaining a supply of ink in the reservoir through a manifold from an ink supply source in an ink cartridge 122, partially shown in FIG. 10. The cartridge manifold is scaled to the ink inlet by adhesive layer 123.

Filter 114 of the present invention has been fabricated, in a first embodiment, and as discussed above, by laser-ablating holes 128 through a thin polymer film to form a fine filter and then adhesively bonding the filter to the fill hole side 117 of channel plate 112 by, for example, the adhesive transfer method disclosed in U.S. Pat. No. 4,678,529, whose contents are hereby incorporated by reference.

While the mesh filter removes many of the particulates coming towards, the ink inlets 125 of the die module of the printhead, this invention is particularly directed to the final filter 114 directly over the ink inlets 120 which serves to stop particles which may originate in the fluid path between the mesh filter and the ink inlets of the die module.

The filter structure i.e., the pore structure for a filter in accordance with the features of the present invention is manufactured by a laser ablation system. In such a system a predetermined portion of a material is treated to remove at least part of the material by directing a laser beam at the material to remove at least part of the material. This process will be referred to as "laser ablation." The laser ablation process functions to effectively remove at least part of the predetermined portion of the material to form the pores without the need for chemical or mechanical treatments.

Figure 3A:
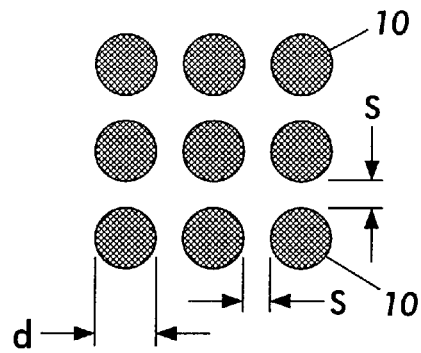
FIG. 3A and FIG. 3B are plan views illustrating the pore structures of prior art filters.
Figure 3B:
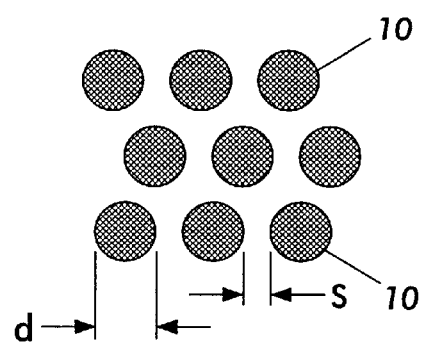
Figure 4:
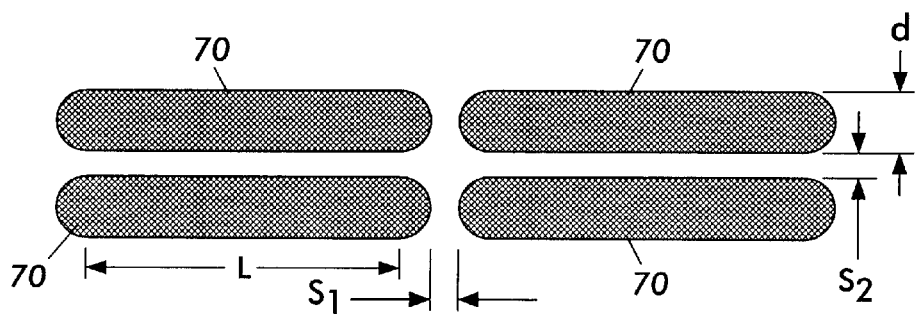
FIG. 4 is a plan view of an embodiment illustrating the pore structure of a filter in accordance with the features of the present invention.

IBM Technical Disclosure Bulletin, Vol. 28, No. 5, Oct. 5, 1985, page 2034 entitled "Lift-Off Stencil Created By Laser Ablation" describes a system for ablating polymeric materials to create holes, vias, or lift-off stencils having a finite taper. The disclosure of this Bulletin is hereby incorporated by reference, In accordance with the features of the present invention it is proposed to keep one dimension of a filter pore narrow so that it can filter out particles, but to extend the length of the pore in order to increase the fraction of open area. A simple embodiment is shown in FIG. 4. A laser beam which would create holes of diameter d is scanned repeatedly (or imaged through a mask) to create a slot 70 of length L and width d. In the embodiment shown in FIG. 4, in addition to the length L, there is a semicircle of diameter d at each end of each slot 70. It is assumed that the spacing between slots 70 end to end is $s_1$, and the parallel spacing of slots 70 is $s_2$. Calculations of the flow resistance of circular holes compared to slots 70 that are at least 10 times as long as wide indicate that the resistance for the slot 70 of width d=2r is reduced by at least a factor of 2 from that of an equivalently packed array of circular holes of radius r. Basically there is illustrated in FIG. 4 an example of an array of slot-shaped filter pores 70 which increases the fraction of open area. Spherical particles (or nearly spherical particles) of diameter larger than d will be prevented from going through the filter, just as in the case of the circular pores 10 in FIGS. 3 and 3B.

Figure 5:
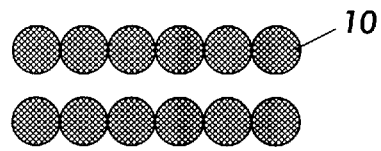
FIG. 5 is a plan view of another embodiment illustrating the pore structure of a filter in accordance with the features of the present invention.
Figure 6:
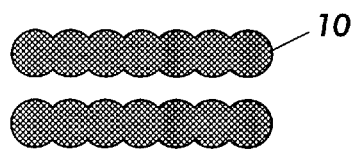
FIG. 6 is a plan view of another embodiment illustrating the pore structure of a filter in accordance with the features of the present invention.

FIGS. 5 and 6 show another embodiment to even further improve the filter effectiveness of the elongated slot pore. In this embodiment, constructions in the width of the slot help block a rod of diameter less than d. Rather than simply rotating parallel to the film until it can drop through, it also needs to be oriented perpendicular to the film. FIG. 5 may be regarded as similar to the arrays of FIG. 4, but setting s=0 in one direction. FIG. 6 shows the case of partial overlap of adjacent holes 10 making up the elongated pores. This provides some constriction in width, while decreasing flow resistance to a value intermediate between FIG. 4 and FIG. 5. As illustrated in the embodiment of FIG. 5 in accordance with the features of this invention, there is shown elongated slot pores with constricted width, formed by letting adjacent holes 10 barely touch. As illustrated in the embodiment of FIG. 6 in accordance with the features of this invention, there is shown elongated slot pores with constricted width, formed by letting adjacent holes 10 overlap.

Figure 7:
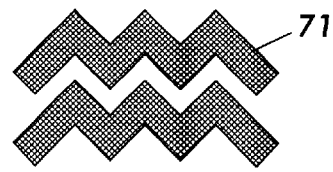
FIG. 7 is a plan view of still another embodiment illustrating the pore structure of a filter in accordance with the features of the present invention.
Figure 8:
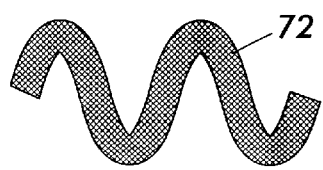
FIG. 8 is a plan view of still another embodiment illustrating the pore structure of a filter in accordance with the features of the present invention.

Still another way to improve the filtration effectiveness of the elongated slot pore is to introduce curvature along its length. Two examples are shown in FIGS. 7 (saw-toothed pore 71) and 8 (sinusoidal pore 72). FIG. 7 illustrates an elongated pore in a saw-tooth pattern so that a linear contaminant cannot easily fall into slot. FIG. 8 illustrates an elongated port in a sinusoidal pattern so that a linear contaminant cannot easily fall into slot.

The optimal length of the elongated slot pore will depend on variables such as mechanical strength as well as flow resistance and filtration effectiveness. This will also depend on material stiffness as well as filter film thickness. There will be a diminishing return for the reduced low flow resistance as the length of the slot grows. Although for simplicity sake flow resistance has been used as a figure of merit, at high flow rates the film inertance may also play an important role. The inertance will also decrease in the elongated pore geometry.

While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A filter pore structure having a plurality of pores through the structure, for catching, small particles in a fluid flow path, each of the pores having a cross section with a length (L) and a width (W), wherein the dimension of L is greater than the dimension of W, the pore structure enabling catching small particles in a fluid due to the pores having one smaller dimension (W) and one larger elongated dimension (L) presented to the fluid flow path.

2. A filter according to claim 1 wherein said pores are formed by a laser ablation process.

3. A filter structure according to claim 1 wherein the cross section of said pores is oval shapes.

4. A filter structure according to claim 3 wherein the cross section of said structure includes a plurality of parallel oval shaped pores.

5. A filter structure according to claim 4 wherein the dimension of L is at least two times the dimension of W.

6. A filter structure according to claim 1 wherein the cross section of each of said pores has a shape of plurality of circular openings in a straight line the outer circumference of each of the openings being in contiguous relation to each other and lying in a straight line.

7. A filter structure according to claim 1 wherein the cross section of each of said pores has a shape of a plurality of circular openings lying in a straight line and each of said openings overlapping each other.

8. A filter structure according to claim 1 wherein the cross section of each of said pores has a shape of a saw-tooth pattern.

9. A filter structure according to claim 1 wherein the cross section of each of said pores has a shape of a sinusoidal pattern.

10. A filter structure according to claim 1 wherein said filter comprises a generally flat member having a first side and a second side.

11. A filter structure of claim 10, wherein said generally flat member comprises a laser ablated film material.

12. A filter structure of claim 11, wherein said laser ablated film material comprises a polymer film.

13. A filter structure according to claim 1 wherein each pore is tapered.

14. An improved ink jet printhead having an ink inlet positioned on a surface, a plurality of nozzles, individual channels connecting the nozzles to an internal ink supplying manifold, the manifold being supplied ink through the ink inlet, and selectively addressable heating elements for expelling ink droplets; the improved ink jet printhead comprising:

a substantially flat filter having predetermined dimensions and being bonded to the printhead containing the ink inlet, the filter having a plurality of pores, for catching small particles in an ink flow path, therethrough, each of the pores having a cross section with a length=L and a width=W, wherein the dimension of L is greater than the dimension of W, the pore structure enabling catching small particles in a fluid due to the pores having one smaller dimension (W) and one larger elongated dimension (L) presented to the ink flow path.

15. The filter of claim 14 further including an adhesive layer bonding said printhead surface to said manifold, the filter formed within said adhesive layer by laser ablation.

16. The ink jet printhead of claim 14 wherein the filter is a polymer film.

17. The ink jet printhead of claim 14 wherein each of said pores are tapered.

18. The ink jet printhead of claim 14 wherein said filter is formed by laser ablation through a mask to form tapered filter pore holes.

19. The ink jet printhead of claim 14 wherein said printhead is a drop-on-demand type functioning printhead.

20. The ink jet printhead of claim 14 wherein said filter is adhesively bonded to said printhead so that the entire ink inlet is covered by said filter.

21. A method for fabricating a filter element comprising the steps of:

positioning a thin polymer film in the output radiation path of an ablating laser, and controlling the laser output so that a plurality of pores are formed in portions of the polymer film; each of said pores having a cross section with a length (L) and a width (W), wherein the dimension of L is greater than the dimension of W.

22. A method according to claim 21 wherein the cross section of said pores is oval shaped.

23. A method according to claim 21 wherein the cross section of each of said pores has a shape of a plurality of circular openings lying in a straight line, the outer circumference of the openings lying in contiguous relation to each other in a straight line.

24. A method according to claim 21 wherein the cross section of each of said pores has a shape of a plurality of overlapping circular openings lying in a straight line.

25. A method according to claim 21 wherein the cross section of each of said pores has a shape of a saw-tooth pattern.

26. A method according to claim 21 wherein each of said pores has a shape of a sinusoidal pattern.

27. A method according to claim 21 wherein each pore is tapered.

28. A method for fabricating a filter element used with an ink jet printing system to prevent contaminants from entering an ink supply inlet of an ink jet die module, comprising steps of:

positioning a thin polymer film in the output radiation path of an ablating laser, controlling the laser output so that a plurality of pores are formed in portions of the polymer film, each of said pores having a cross section with a length (L) and a width (W), wherein the dimension of L is greater than the dimension of W; and bonding the filter element to the ink supply inlet of the die module.

* * * * *